March 14, 1933.  M. SCHROEDER  1,901,416

PRODUCTION OF GASEOUS MIXTURES CONTAINING SULPHUR DIOXIDE

Filed June 22, 1929

Inventor:

Max Schroeder

Patented Mar. 14, 1933

1,901,416

UNITED STATES PATENT OFFICE

MAX SCHROEDER, OF BERLIN, GERMANY

PRODUCTION OF GASEOUS MIXTURES CONTAINING SULPHUR DIOXIDE

Application filed June 22, 1929, Serial No. 373,024, and in Germany May 15, 1929.

My invention refers to the production of sulphuric acid and more especially to means whereby mixtures of sulphur dioxide and air, which are rich in sulphur dioxide, can be recovered from mixtures which contain less sulphur dioxide.

As is well known to those skilled in the art, the recovery of pure sulphur dioxide from burner gases or from the gases of combustion of sulphur is effected by causing the sulphur dioxide forming part of these mixtures to be dissolved in water, whereupon the watery solution is heated to boiling temperature and steam is introduced to expel the sulphur dioxide. After condensation of the steam a sulphur dioxide gas of about 100% is obtained.

In order to convert this gas into ordinary and fuming sulphuric acid by the contact process, it has been the custom to mix the pure sulphur dioxide gas with three parts by volume of air, this mixture being then passed at a suitable temperature over a contact substance containing platinum as a catalyst, whereby it was converted into sulphuric acid anhydride which was then absorbed in sulphuric acid.

While this process presented considerable advantages as compared with the direct conversion of purified burner gases, which was resorted to subsequently, its use was discontinued in view of the high costs of heating the dilute watery solution of $SO_2$ to boiling temperature. For the recovery of 100 kilograms pure sulphur dioxide about 150 kilograms carbon are required.

These costs as well as the first costs of boilers for heating the dilute solution can be saved altogether if according to the present invention the expulsion of the sulphur dioxide gas from the solution and the preparation of the gas mixture for the manufacture of sulphuric acid is effected in the cold.
If for instance burner gases containing 6 per cent by volume $SO_2$ are passed upwardly through a tower 20 metres in height and filled with coke sprinkled with the quantity of water required for dissolving the gas, there is obtained at ordinary temperature a solution containing about 9 kilograms $SO_2$ per cubic metre, while at the top the residual gases almost completely free from $SO_2$ escape. This process occurs in accordance with Henry-Dalton's Law of Gas Absorption, according to which at each point in the tower a state of equilibrium will form between the gas tension of the sulphur dioxide in the gas mixture and in the liquid.

If now the cold solution of $SO_2$ produced in the first tower is made to trickle down another coke filled tower, through which is forced by suction the required quantity of fresh air in ascending direction, the process will be reversed. There is now obtained at the bottom a liquid substantially free from sulphur dioxide, and at the top a gas mixture containing $SO_2$ and air. In view of the fact that owing to the short time during which the gas has been in contact with the liquid, a certain difference of tension will prevail between the percentage of $SO_2$ in the solution and in the gas mixture, it will never be possible, under ordinary conditions, to obtain a gas mixture having a percentage of $SO_2$ equalling that of the starting gas mixture. Therefore this mode of operating, in spite of the great purity of the gas mixture obtained, is not commercial.

According to this invention now the production of a pure and rich mixture of $SO_2$ and air is obtained without heating the solution of $SO_2$ by causing the sulphur dioxide in the starting gas mixture to be absorbed under increased pressure, for instance as disclosed in German Patent 421,725. The expulsion of the $SO_2$ from the cold watery solution is then effected by means of an air current under atmospheric or slightly reduced pressure, which can be obtained by sucking in the air to be admixed. In this manner not only gas mixtures containing 20 per cent $SO_2$ and 80 per cent air can be obtained, but also mixtures having a greater percentage of $SO_2$, according to the absorption pressure. However as the mixture must not contain more than 25 per cent by volume $SO_2$, as otherwise the oxygen in the mixture would not suffice for the oxidation, any higher contents of $SO_2$ must be reduced by the further admixture of air.

If gas mixtures containing 18–20 per cent by volume $SO_2$ are to be produced in the cold, the solutions must contain about 30–35 kilograms $SO_2$ per cubic metre. This percentage can be obtained from normal burner gases by means of increased pressure of about 3 atmospheres. If poor gases are operated upon, a higher absorption pressure must be applied. It is, however, also possible to operate with solutions containing less $SO_2$; for it is not necessary that the gas mixtures contain 18–20 per cent by volume $SO_2$. Such a high percentage only renders it possible to operate also the contact process itself with cold gases. In view of the fact that the heat of reaction of rich gases of this kind suffices to keep the process going, it is only necessary, when starting the operation, to heat the contact mass to reaction temperature.

In the drawing affixed to this specification and forming part thereof an apparatus for performing the invention is illustrated diagrammatically by way of example.

In the drawing

Figure 1:
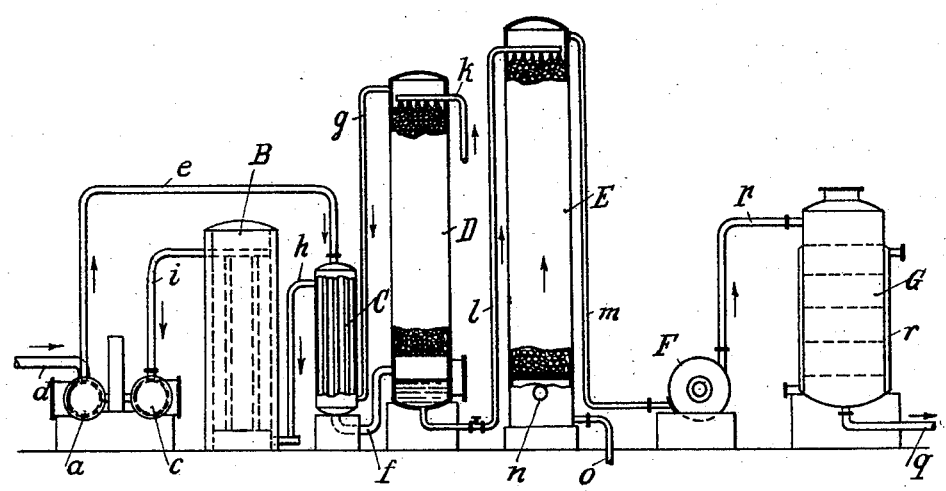
Fig. 1 is an elevation.
Figure 2:
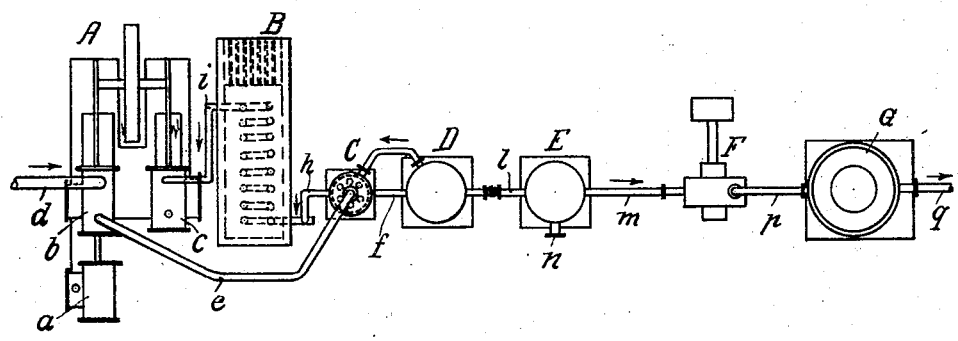
Fig. 2 is a plan view, partly in section.

Referring to the drawing, A is a compressor, $a$ is the steam cylinder, $b$ the compression cylinder, $c$ the expansion cylinder. This latter cylinder serves the purpose of reutilizing the tension of the non-absorbed gases in a well known manner for the operation of the compressor. In order that this can be effected in a satisfactory manner, there is inserted in the pipe leading from the absorber to the expansion cylinder the heater B, which may either be heated by waste heat or by direct heat. Obviously the steam cylinder $a$ may be replaced by an electromotor or by some other suitable driving means.

The burner gases, after having previously been purified, are sucked through the pipe $d$ by the compression cylinder $b$ and are forced under pressure through pipe $e$ into the tubular boiler C in which their heat of compression is abducted, to be preferably transferred onto the waste gases flowing from the absorber D through pipe $g$ and which thereafter flow through pipe $h$ into the system of tubes in the heater B, where they are heated further and from there through pipe $i$ into the expansion cylinder $c$.

From the boiler C the cooled gases under pressure pass through pipe $f$ into the bottom part of the absorber D, which is kept under suitable pressure and is filled with coke or other suitable material in small pieces, which is sprinkled with water supplied through pipe $k$. The solution of $SO_2$ collecting at the bottom of the absorber and whose level can be ascertained by means of a gauge, is forced by the pressure in D through pipe $l$, in which a regulating valve is inserted, into the top portion of the gas expelling tower E which is provided with a lead lining as usual. In this tower, which is also filled with coke or the like, the solution, which trickles down, meets an ascending air current sucked through pipe $m$, into the opening $n$ at the bottom of the tower E by a fan F. This air current is so chosen that gas mixtures rich in $SO_2$ are obtained as far as this is possible according to the percentage of $SO_2$ in the solution. The liquor substantially freed from $SO_2$ continuously escapes through pipe $o$.

If waste steam is available, such steam might be admixed to the air introduced for expelling $SO_2$ from its solution, but this steam would be condensed already in the bottom zone of the tower by the cold liquid trickling down and would merely act towards further reducing the small residual quantity of $SO_2$ in the solution, but would not influence the degree of gas expulsion in the higher portions of the tower. The maximum of $SO_2$ obtainable in the gases depends also in such a case from the temperature and percentage of the solution of $SO_2$ coming from the absorber.

Slight heating of the solution flowing from the absorber to the gas expelling tower is of no practical value either, the heating costs being considerably higher than the advantages obtainable thereby. The process according to this invention renders it easy to obtain rich gas mixtures from the cold solution flowing in counter current to air.

As the gases escaping from the cold solution contain only little water, a complete drying of the gases will not be necessary and preheating of the gases may also be dispensed with, where gases having a high percentage of $SO_2$ are acted upon. In this case the gases pass directly from the fan F through pipe $p$ into the converter G which has previously been heated to reaction temperature. The converter may be provided with a cooling jacket $r$ or a system of tubes may be provided intermediate the first and second layer of contact mass in order to remove the heat of reaction in excess. This can be effected either by cooling with air or with the cold waste gases from the obsorption under pressure, which are thus preheated. If operating with poorer gases, they may also be conducted through the cooling jacket or the system of tubes in the converter, in order to be preheated before passing through the first layer of contact mass. Pipe $q$ serves to lead the gases into the apparatus where $SO_3$ is absorbed.

The particular value of the new process consists therein that it permits utilizing also all such gases, which would not lend themselves readily to direct conversion after the contact process, such as burner gases containing gaseous contact poisons, which cannot be removed by electrostatic purification. While otherwise the contact substance would soon become less active, the pure gas mixtures obtained according to this invention do not affect the activity of the contact mass.

The invention further involves the advantage that instead of the air which has been partly consumed in the roasting or in the combustion of sulphur, fresh air having its normal contents of oxygen is used. It is therefore possible to carry operations through with the 3-fold percentage of gas and without preheating same, and in consequence thereof the dimensions of the converter are reduced to such an extent that the first costs of the compressor and absorber are balanced thereby. In the operation of the process the costs of preheating the gases, which are often very high, if the contact has become less active and the gases are diluted, are not incurred at all. They are replaced by the lower costs of heating the waste gases under pressure, before they are allowed to expand. However, waste heat from the reduction or melting ovens will be available for this purpose in most cases.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

I claim:—

1. The method of producing a mixture of sulphur dioxide and oxygen which comprises forming a liquid solution of sulphur dioxide at a predetermined pressure, and passing a gas containing oxygen in contact with the solution at a lower pressure.

2. The method of producing a mixture of sulphur dioxide and oxygen which comprises forming an aqueous solution of sulphur dioxide at a predetermined pressure, and passing a gas containing oxygen in contact with the solution at a lower pressure.

3. The method of producing a mixture of sulphur dioxide and oxygen which comprises forming an aqueous solution of sulphur dioxide at a predetermined pressure, and passing air in contact with the solution at a lower pressure.

4. The method of producing a mixture of sulphur dioxide and oxygen which comprises forming a liquid solution of sulphur dioxide at a pressure greater than atmospheric pressure, and passing a gas containing oxygen in contact with the solution at substantially atmospheric pressure.

5. The method of producing a mixture of sulphur dioxide and oxygen which comprises forming a liquid solution of sulphur dioxide at a pressure greater than atmospheric pressure, and passing a gas containing oxygen in contact with the solution at a pressure lower than atmospheric pressure.

6. The method of producing a mixture of sulphur dioxide and oxygen which comprises forming an aqueous solution of sulphur dioxide at a pressure greater than atmospheric pressure, and passing air in contact with the solution at substantially atmospheric pressure and temperature.

7. The method of producing a mixture of sulphur dioxide and oxygen which comprises forming an aqueous solution of sulphur dioxide and passing air in contact with the solution under reduced pressure, the volume of air and the pressure being so regulated as to produce a mixture of gases containing sulphur dioxide and oxygen in substantially the proper proportions for conversion to sulphur trioxide.

8. The method of forming a mixture of sulphur dioxide and oxygen which comprises tranferring sulphur dioxide from furnace gases to a body of liquid solvent at a pressure greater than atmospheric pressure, and passing the resulting solution and a stream of gas containing oxygen in counter-current relationship at a pressure lower than atmospheric pressure.

9. The method of forming a mixture of sulphur dioxide and oxygen which comprises transferring sulphur dioxide from furnace gases to a body of liquid solvent at a pressure greater than atmospheric pressure, and passing the resulting solution and a stream of air in counter-current relationship at substantially atmospheric pressure and temperature.

10. The method of forming a mixture of sulphur dioxide and air which comprises circulating water in contact with furnace gases containing sulphur dioxide at a predetermined pressure to form an aqueous solution of sulphur dioxide, and circulating the resulting solution in contact with a current of air at a lower pressure, the pressures and the volumes of air and furnace gases being so regulated as to produce a mixture of air and sulphur dioxide containing predetermined relative amounts of sulphur dioxide and oxygen.

11. The method of forming a mixture of sulphur dioxide and air which comprises circulating water in contact with furnace gases containing sulphur dioxide at a predetermined pressure to form an aqueous solution of sulphur dioxide, and circulating the resulting solution in contact with a current of air at a lower pressure, the pressures and the volumes of air and furnace gases being so regulated as to produce a mixture of air and sulphur dioxide containing sulphur dioxide and oxygen in substantially the proper proportions for conversion to sulphur trioxide.

12. The method of forming a mixture of sulphur dioxide and oxygen which comprises passing furnace gases containing sulphur dioxide and a liquid capable of dissolving sulphur dioxide in counter-current relationship to form a solution of sulphur dioxide, and passing the resulting solution and a body of gas containing oxygen in counter-current relationship at a reduced pressure.

13. The method of transferring sulphur dioxide from one body of gas to another which comprises passing the gas from which the sulphur dioxide is to be transferred in contact with a liquid solvent for sulphur dioxide at a predetermined pressure to form a solution of sulphur dioxide, and passing the gas to which the sulphur dioxide is to be transferred in contact with the resulting solution at a lower pressure.

14. The method of transferring sulphur dioxide from one body of gas to another which comprises passing the gas from which the sulphur dioxide is to be transferred in contact with a liquid solvent for sulphur dioxide at a predetermined pressure to form a solution of sulphur dioxide, and passing a mixture of gases comprising steam and gas to which the sulphur dioxide is to be transferred in contact with the resulting solution at a lower pressure.

15. The method of forming a mixture of gases comprising sulphur dioxide and one or more desirable components which comprises subjecting a mixture of gases comprising sulphur dioxide and one or more undesirable components to the action of a liquid solvent at a predetermined pressure to form a solution of sulphur dioxide, and passing the gas to be mixed with the sulphur dioxide in contact with the resulting solution at a lower pressure.

In testimony whereof I affix my signature.

MAX SCHROEDER.